United States Patent
Cuan et al.

(10) Patent No.: US 12,450,641 B2
(45) Date of Patent: Oct. 21, 2025

(54) PEER-BASED SELECTION USING MACHINE LEARNING

(71) Applicant: Capital One Services, LLC, McLean, VA (US)

(72) Inventors: Lukiih Cuan, Washington, DC (US); Lea Cody, Washington, DC (US); Phoebe Atkins, Rockville, VA (US)

(73) Assignee: Capital One Services, LLC, McLean, VA (US)

( * ) Notice: Subject to any disclaimer, the term of this patent is extended or adjusted under 35 U.S.C. 154(b) by 198 days.

(21) Appl. No.: 17/657,250

(22) Filed: Mar. 30, 2022

(65) Prior Publication Data

US 2023/0316372 A1    Oct. 5, 2023

(51) Int. Cl.
*G06Q 30/0601* (2023.01)
*G06N 20/00* (2019.01)
*G06Q 10/02* (2012.01)

(52) U.S. Cl.
CPC ......... *G06Q 30/0631* (2013.01); *G06N 20/00* (2019.01); *G06Q 10/02* (2013.01)

(58) Field of Classification Search
CPC ..... G06Q 30/0631; G06Q 10/02; G06N 20/00
See application file for complete search history.

(56) References Cited

U.S. PATENT DOCUMENTS

| | | | |
|---|---|---|---|
| 9,953,342 B1* | 4/2018 | Gourley | G06Q 30/0255 |
| 2010/0130179 A1* | 5/2010 | Colligan | H04W 4/12 |
| | | | 455/414.1 |
| 2015/0032543 A1 | 1/2015 | Weis et al. | |
| 2016/0342902 A1* | 11/2016 | Pinckney | G06Q 30/02 |
| 2017/0061286 A1* | 3/2017 | Kumar | G06Q 30/0269 |
| 2017/0199874 A1* | 7/2017 | Patel | H04W 4/023 |
| 2020/0279339 A1* | 9/2020 | Akutagawa | G06F 16/90324 |
| 2022/0051664 A1* | 2/2022 | Baror | G06F 3/0482 |
| 2022/0067788 A1* | 3/2022 | Raviv | G06N 3/105 |

OTHER PUBLICATIONS

Beierle et al., "Collaborating with Users in Proximity for Decentralized Mobile Recommender Systems," 2019 IEEE (SmartWorld/SCALCOM/UIC/ATC/CBDCom/IOP/SCI), Leicester, UK, 2019, pp. 1192-1197, doi: 10.1109/SmartWorld-UIC-ATC-SCALCOM-IOP-SCI.2019.00222. (Year: 2019).*

* cited by examiner

*Primary Examiner* — Rupangini Singh
*Assistant Examiner* — Tayar M Kyu
(74) *Attorney, Agent, or Firm* — Harrity & Harrity, LLP

(57) ABSTRACT

In some implementations, a system may generate a first exchange profile for a first user and a second exchange profile for a second user. The first exchange profile may identify one or more characteristics of an exchange behavior of the first user based on exchange data of the first user, and the second exchange profile may identify one or more characteristics of an exchange behavior of the second user based on exchange data of the second user. The system may receive, from a first device of the first user, a request for a selection for the first user. The system may determine, based on the first exchange profile and the second exchange profile, an entity that is relevant to the first user. The system may transmit, to the first device of the first user, information indicating the selection for the first user, where the selection identifies the entity.

20 Claims, 10 Drawing Sheets

PEER-BASED SELECTION USING MACHINE LEARNING

BACKGROUND

An individual may solicit recommendations of merchants, such as shops, restaurants, boutiques, or the like, from other individuals. In some cases, the individual may utilize a recommendation engine for such recommendations. Generally, the recommendation engine may provide tourist-friendly recommendations for a particular city or area. However, the individual may be more interested in recommendations from local residents of the city or area.

SUMMARY

Some implementations described herein relate to a system for peer-based selection using machine learning. The system may include one or more memories and one or more processors communicatively coupled to the one or more memories. The one or more processors may be configured to generate a first exchange profile for a first user and a second exchange profile for a second user. The first exchange profile may identify one or more characteristics of an exchange behavior of the first user based on exchange data of the first user, and the second exchange profile may identify one or more characteristics of an exchange behavior of the second user based on exchange data of the second user. The one or more processors may be configured to receive, from a first device of the first user, a request for a selection for the first user that is based on the second user. The one or more processors may be configured to determine, based on processing the first exchange profile and the second exchange profile using a machine learning model, an entity involved in at least one exchange of the second user that is relevant to the first user. The one or more processors may be configured to transmit, to the first device of the first user, information indicating the selection for the first user, where the selection identifies the entity.

Some implementations described herein relate to a non-transitory computer-readable medium that stores a set of instructions for peer-based selection using machine learning. The set of instructions, when executed by one or more processors of a first device of a first user, may cause the first device to perform an interaction with a second device of a second user. The interaction may be for initiating a request for a selection for the first user that is based on the second user. The set of instructions, when executed by the one or more processors of the first device, may cause the first device to transmit, to a server device, the request for the selection for the first user based on performing the interaction. The set of instructions, when executed by the one or more processors of the first device, may cause the first device to receive, from the server device, information indicating the selection for the first user. The selection may identify an entity involved in at least one exchange of the second user that is likely to be of interest to the first user based on a first exchange profile for the first user that identifies one or more characteristics of an exchange behavior of the first user, and a second exchange profile for the second user that identifies one or more characteristics of an exchange behavior of the second user.

Some implementations described herein relate to a method for peer-based selection. The method may include generating a first exchange profile for a first user and a second exchange profile for a second user. The first exchange profile may identify one or more characteristics of an exchange behavior of the first user based on exchange data of the first user, and the second exchange profile may identify one or more characteristics of an exchange behavior of the second user based on exchange data of the second user. The method may include receiving, from a first device of the first user, a request for a selection for the first user. The method may include determining, based on the first exchange profile and the second exchange profile, an entity that is relevant to the first user. The method may include transmitting, to the first device of the first user, information indicating the selection for the first user, where the selection identifies the entity.

DETAILED DESCRIPTION

Figure 1A:
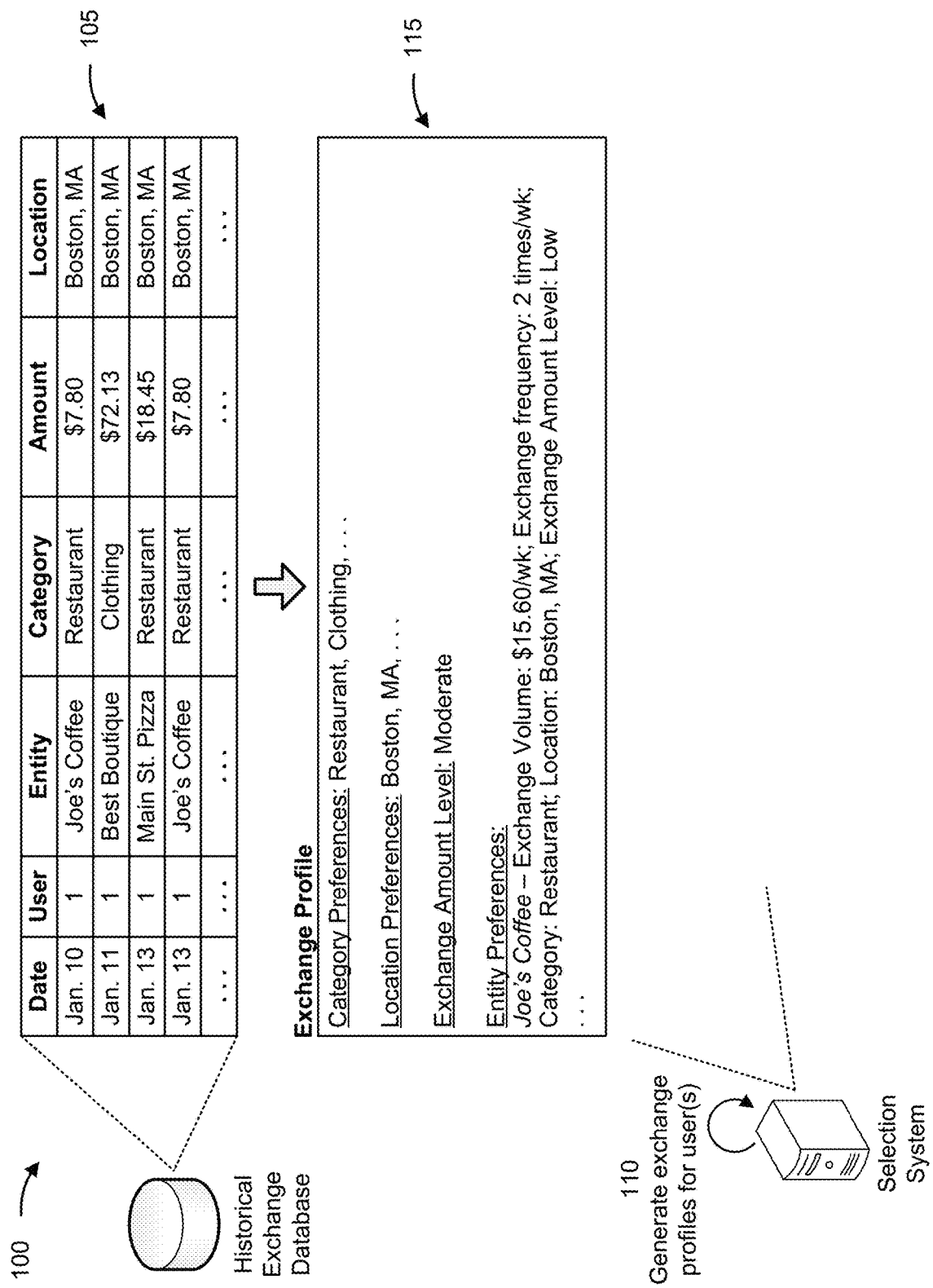
FIGS. 1A-1E are diagrams of an example implementation relating to per-based selection.

The following detailed description of example implementations refers to the accompanying drawings. The same reference numbers in different drawings may identify the same or similar elements.

As described above, a user may utilize a recommendation engine to obtain recommendations of merchants, such as shops, restaurants, boutiques, or the like. For example, the user may provide one or more parameters, such as a city of interest, a merchant category of interest, or the like, to the recommendation engine, and the recommendation engine may return one or more recommendations to the user.

To determine a recommendation, a recommendation engine may gather hundreds, thousands, or even millions of merchant and/or user records relating to historical transactions, reviews, web browsing behavior, or the like. The recommendation engine may then process the records using various aggregation techniques and/or machine learning techniques to determine one or more recommendations that may be of interest to a user. For example, the recommendation engine may attempt to identify characteristics of the user (e.g., age, occupation, marital status, etc.) that are relevant for the recommendation, identify hundreds or even thousands of other users with the same or similar characteristics, and determine the recommendation based on the historical behavior of the other users. Thus, the recommendation engine may expend significant computing resources (e.g., processing resources and/or memory resources) to determine the recommendation. Moreover, the recommendation engine may be unable to identify characteristics of a user that are actually relevant for the recommendation, and therefore the recommendation engine may provide a recommendation that is not likely of interest to the user. Providing a recommendation that is not likely of interest to the user may consume computing resources and/or network resources that could otherwise be conserved. Furthermore, in some cases, the recommendation engine may provide a bulk set of recommendations, which the user may need to filter (e.g., by merchant category, price range, location, or the like) in order to identify recommendations of interest to the user. Such filtering consumes additional computing resources and/or network resources.

Some implementations described herein provide a system for peer-based selection that is configured to determine a selection (e.g., a recommendation, or the like) of an entity (e.g., a merchant, or the like) for a first user based on a single second user or a small set of second users (e.g., five or fewer second users, three or fewer second users, or two or fewer second users). In some implementations, a first device of the first user may transmit a request to the selection system for the selection for the first user. The request may be initiated based on an interaction of the first device with a second device of the second user (e.g., an exchange of information between the devices based on "tapping" the devices). In some implementations, the selection system may generate respective exchange profiles for the first user and the second user. An exchange profile (e.g., a transaction map) may identify characteristics of an exchange behavior of a user based on historical exchanges (e.g., transactions, or the like) of the user. The selection system may determine a selection of an entity for the first user based on an intersection of the exchange profiles for the first user and the second user. For example, the selection system may determine the selection of the entity based on processing the exchange profiles for the first user and the second user using a machine learning model. Once the selection of the entity is determined for the first user and communicated to the first device, the selection system and/or the first device may perform one or more automated actions. For example, the selection system and/or the first device may transmit a request for a reservation for the first user with the entity, generate a calendar entry associated with the entity, or the like.

In this way, the selection system provides relevant selections using historical data associated with just two users or a small group of users. Thus, the selection system conserves significant computing resources relative to a recommendation engine that processes hundreds, thousands, or even millions of records to determine recommendations. Moreover, the selection system may determine selections of interest to a user with improved accuracy, thereby conserving computing resources and/or network resources that would otherwise be consumed using a recommendation engine that cannot accurately identify recommendations of interest to a user. Furthermore, by using exchange profiles, the selection system may determine selections for a user that align with particular preferences of the user (e.g., price range, merchant category, or the like), thereby reducing an amount of filtering of recommendation results that the user would otherwise need to perform. Accordingly, the selection system conserves computing resources and/or network resources that would otherwise be consumed by extensive filtering of recommendation results.

FIGS. 1A-1E are diagrams of an example 100 associated with peer-based selection. As shown in FIGS. 1A-1E, example 100 includes a selection system, a first user device, a second user device, and one or more databases (e.g., a historical exchange database). These devices are described in more detail in connection with FIGS. 3 and 4.

The first user device may be associated with a first user, and the second user device may be associated with a second user. The first user and the second user may be acquaintances, friends, coworkers, family members, or the like. In other words, the first user and the second user are not strangers to each other.

As described herein, the first user may desire and receive a selection of an entity that is based on the second user. However, the description to follow is equally applicable to a case in which the second user may desire and receive a selection of an entity that is based on the first user. In some implementations, the first user and/or the second user may select (e.g., via an input to the first user device and/or the second user device) one or more exchange categories (e.g., "Restaurants," "Bars," "Nail Salons," or the like) for sharing with other users. If an exchange category is selected for sharing by a user, then historical exchange data relating to the exchange category and associated with the user may be used for determining a recommendation for another user.

As shown in FIG. 1A, the historical exchange database may store historical exchange data 105 (e.g., historical transaction data, or the like). The historical exchange data 105 may include one or more entries respectively associated with one or more exchanges. An exchange may include an exchange (e.g., a transaction) for goods and/or services between a user and an entity (e.g., a merchant). For illustration, the historical exchange data 105 is shown for a single user. For example, the historical exchange data 105 that is shown may be associated with the first user or the second user. In practice, each of the users may be associated with respective sets of historical exchange data. Moreover, the respective sets of historical exchange data for each user may be different (e.g., at least one entry of the historical exchange data for the first user may be different from at least one entry of the historical exchange data for the second user). As shown, an entry of the historical exchange data 105 may include data associated with an exchange. For example, the entry may identify a date and/or a time of the exchange, a user associated with the exchange, an entity associated with the exchange, a category associated with the entity, an amount of the exchange, and/or a location of the entity, among other examples.

As shown by reference number 110, the selection system may generate exchange profiles for one or more users. For example, the selection system may generate a first exchange profile for the first user and a second exchange profile for the second user. The selection system may generate an exchange profile (e.g., a new exchange profile or an updated exchange profile) for a user periodically or based on a triggering event, such as the user executing a new exchange or the user being involved in a request for a selection, as described below.

The selection system may generate an exchange profile for a user based on historical exchange data associated with the user. To generate an exchange profile for a user, the selection system may identify characteristics of an exchange behavior of the user that are significant (e.g., relative to exchange behaviors of a plurality of other users) based on historical exchange data associated with the user (e.g., by comparing the exchange data of the user to the exchange data of the plurality of other users). As an example, if the user performs an exchange with a particular restaurant at least twice per week, while other users perform exchanges with the restaurant monthly or yearly, then the selection system may determine that the user has a preference for the restaurant. In some implementations, the selection system may generate an exchange profile for a user using a machine learning model trained to identify characteristics of an exchange behavior of the user that are significant based on historical exchange data associated with the user.

Reference number 115 shows an example exchange profile generated for a user based on the historical exchange data 105 for the user. As shown, the exchange profile 115 may identify one or more characteristics of an exchange behavior of the user based on the historical exchange data 105 for the user (e.g., based on preferences of the user that are identified as described above). For example, the exchange profile 115 may identify one or more entity categories preferred by the user, one or more preferred locations (e.g., a city, a zip code, a neighborhood, or the like) for exchanges of the user, and/or an exchange amount level (e.g., high, moderate, or low, among other examples) preferred by the user, among other examples. Additionally, or alternatively, the exchange profile 115 may identify one or more entities preferred by the user. For an entity preferred by the user, the exchange profile 115 may identify an exchange volume (e.g., a weekly volume, a monthly volume, a yearly volume, or the like) of the user for the entity, an exchange frequency (e.g., over a week, a month, a year, or the like) of the user for the entity, an entity category associated with the entity, a location of the entity, a recency of one or more exchanges with the entity, and/or an exchange amount level of the user for the entity, among other examples.

In some implementations, the exchange profile 115 may identify an intensity of a preference of the user (e.g., the exchange profile 115 may include a heat map). For example, the exchange profile 115 may rank multiple preferences of the user in order of preference, may indicate respective scores that identify a level of intensity for the multiple preferences, or the like. As an example, for the entity category preferences of the user, the exchange profile 115 may indicate that the user has a very strong preference for restaurants and a moderate preference for clothing stores.

For illustration, the exchange profile 115 is shown for a single user, similarly as described above. For example, the exchange profile 115 that is shown may be associated with the first user or the second user. In practice, each user may be associated with a respective exchange profile. Moreover, the respective exchange profiles for the first and second users may be different.

Figure 1B:
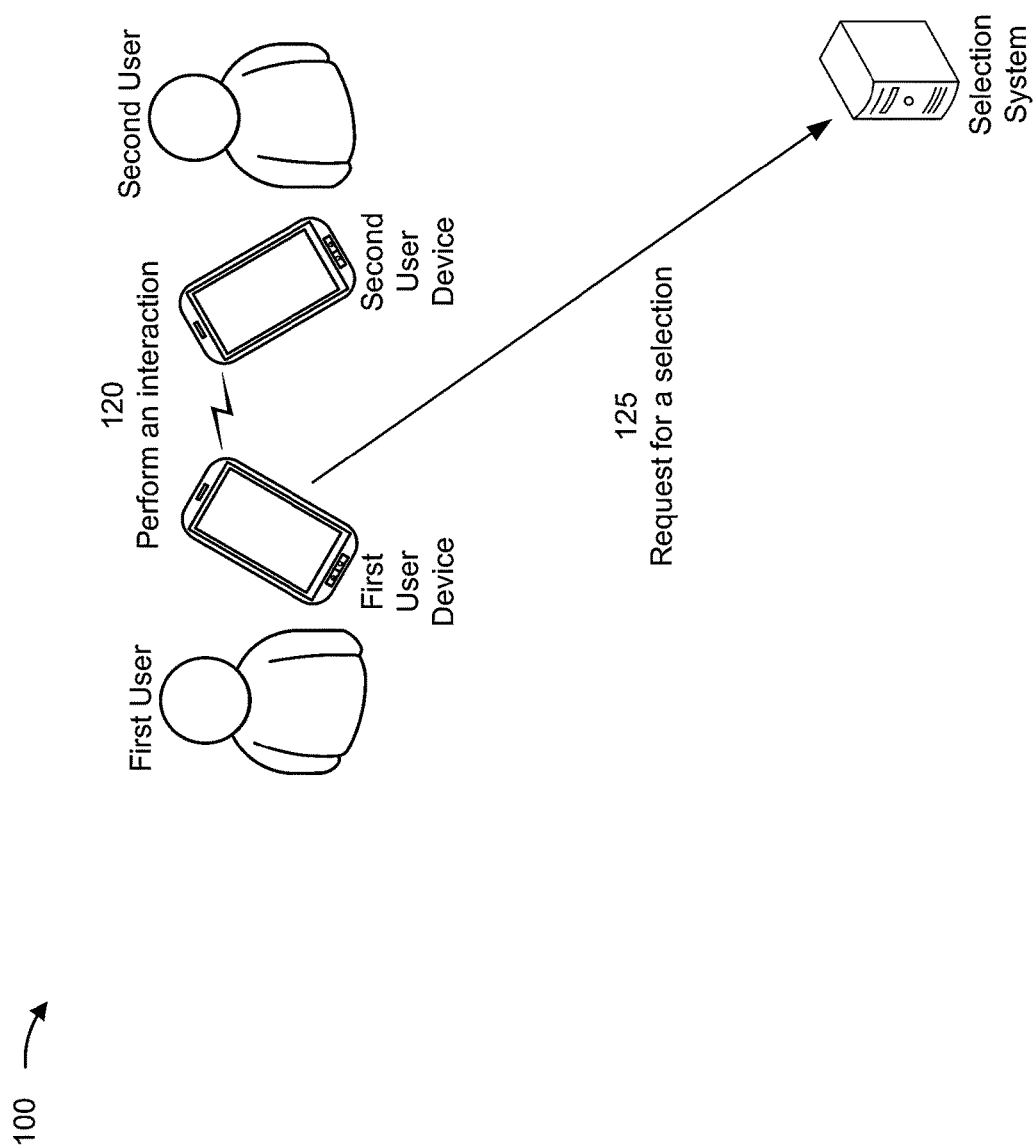

As shown in FIG. 1B, and by reference number 120, the first user device may perform an interaction with the second user device. The interaction may be based on the first user and the second user "tapping" the first user device and the second user device (e.g., touching the first user device and the second user device together or bringing the first user device and the second user device within close proximity, such as within 1 or 2 inches of each other). In some implementations, the interaction of the first user device and the second user device may include an exchange of information (e.g., a request indicating that the first user desires a selection based on the second user and/or a response approving the request) between the first user device and the second user device using short-range wireless communication, such as near field communication (NFC), Bluetooth Low Energy (BLE), or the like. In some implementations, the interaction may include an exchange of information between the first user device and the second user device via applications (e.g., web browsers, mobile applications, or the like) implemented on the first user device and the second user device. In connection with the interaction, the first user device may receive an input from the first user indicating that the first user desires a selection based on the second user and/or the second user device may receive an input from the second user indicating that the second user approves of the first user receiving a selection based on the second user.

As shown by reference number 125, the first user device may transmit, and the selection system may receive, a request for a selection for the first user. For example, the first user device may transmit the request based on performing the interaction with the second user device. In other words, the interaction of the first user device and the second user device may initiate the request from the first user device (e.g., may cause the first user device to transmit the request).

The request for the selection for the first user may indicate a request for the selection system to provide a recommendation of an entity (e.g., one or more recommendations of one or more entities) for the first user. Moreover, the request may indicate that the selection is to be based on the second user. In other words, the request for the selection may identify the particular person or people that the selection is to be based on (e.g., using historical exchange data for the particular person or people).

In some implementations, the request for the selection may be for the first user and the second user (or one or more other users). That is, the request for the selection may indicate a request for the selection system to provide a recommendation of an entity that is relevant to the first user and the second user (i.e., a joint selection for the first user and the second user). In some implementations, the request for the selection may be transmitted by the first user device and by the second user device (e.g., both devices may transmit the request to indicate mutual consent for the selection system to provide the selection for the first user that is based on the second user). In some implementations, the request for the selection may be transmitted by the second user device (e.g., on behalf of the first user or for a joint selection).

Figure 1C:
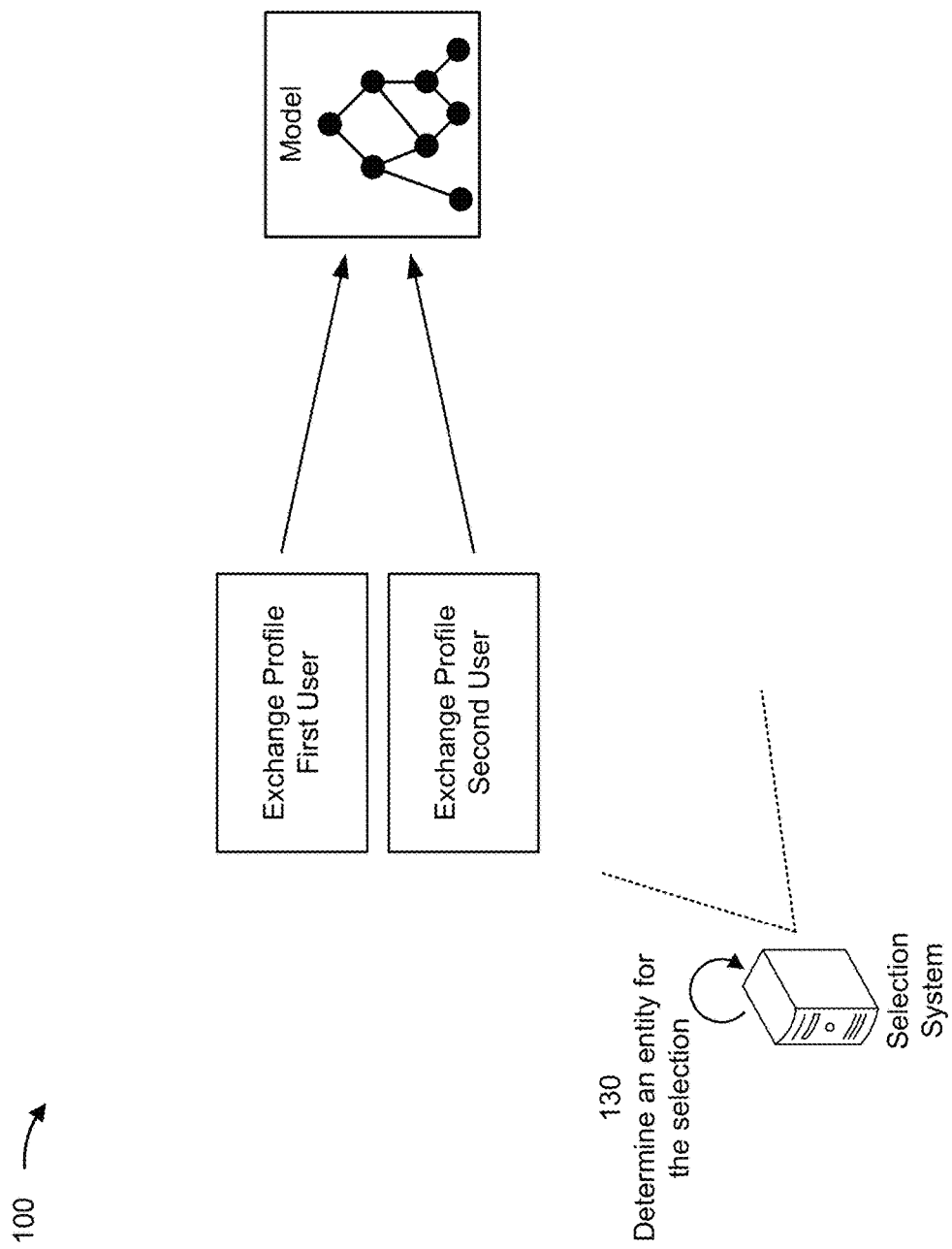

As shown in FIG. 1C, and by reference number 130, the selection system may determine an entity (e.g., one or more entities) that is relevant (e.g., likely to be of interest) to the first user. The selection system may determine the entity in response to receiving the request for the selection.

The selection system, in response to receiving the request for the selection for the first user that is based on the second user, may determine the entity that is relevant to the first user based on a first exchange profile associated with the first user and a second exchange profile associated with the second user. For example, the selection system may determine the entity based on processing the first exchange profile and the second exchange profile. In some implementations, the selection system may determine the entity based on processing the first exchange profile and the second exchange profile using a machine learning model, as described in connection with FIG. 2. To process the first exchange profile and the second exchange profile (e.g., using the machine learning model), the selection system may determine an intersection of the first exchange profile and the second exchange profile. The intersection may indicate at least one characteristic of the exchange behavior of the first user that corresponds to (e.g., matches, is similar to, is within a threshold amount of, or the like) at least one characteristic of the exchange behavior of the second user.

For example, if the first exchange profile indicates a preference of the first user for restaurants, and if the second exchange profile indicates a preference of the second user for restaurants, then the selection system may determine that the intersection of the first exchange profile and the second exchange profile is for restaurants, thereby indicating that the entity determined by the selection system may be a restaurant. As another example, if the second exchange profile indicates a preference of the second user for bars, and if the first exchange profile does not indicate a preference of the first user for bars, then the selection system may determine that there is no intersection of the first exchange profile and the second exchange profile for bars, thereby indicating that the entity determined by the selection system may not be a bar. As a further example, if the first exchange profile indicates a preference of the first user for a low exchange amount, and if the second exchange profile indicates a preference of the second user for a high exchange amount, then the selection system may determine that there is no intersection of the first exchange profile and the second exchange profile for exchange amount, thereby indicating that the entity determined by the selection system may be associated with a low exchange amount. In this way, the selection system may determine an accurate selection for the first user, thereby eliminating a need for the first user to perform extensive filtering of the selection results.

Based on the intersection of the first exchange profile and the second exchange profile, the selection system may determine the entity that is relevant to the first user. The entity that is determined may be involved in at least one historical exchange of the second user. For example, the entity may be a preferred entity of the second user that is indicated by the second exchange profile. The entity determined by the selection system may be associated with one or more characteristics that correspond to preferences of the first user according to the first exchange profile. For example, if the first exchange profile indicates a preference of the first user for a low exchange amount, then the entity determined by the selection system may be associated with a low exchange amount.

In some implementations, the entity determined by the selection system may be associated with a current location of the first user (e.g., the entity may be a local recommendation for the first user). Here, the selection system may determine a location of the first user. For example, the selection system may determine the location of the first user based on one or more recent exchanges of the first user. As an example, the selection system may determine the location of the first user to be a location associated with one or more most-recent exchanges of the first user. As another example, the selection system may determine the location of the first user to be a destination location associated with an exchange of the first user for air travel, train travel, or the like. As a further example, the selection system may obtain location information (e.g., geographic coordinates) from the first user device, and the selection system may determine the location of the first user based on the location information.

In some implementations, the second exchange profile used by the selection system to determine the entity may relate to at least one entity category selected for sharing by the second user (e.g., according to an input provided by the second user to the second user device). For example, the second user may choose to share exchange behaviors of the second user associated with restaurants, but may choose not to share exchange behaviors of the second user associated with bars. In some implementations, the first exchange profile and/or the second exchange profile may exclude entities or entity categories that have low recommendation value, such as fast food restaurants, gas stations, or the like.

The selection system may determine the entity for the selection based solely on the first exchange profile and the second exchange profile. In other words, the selection system may determine the entity using data associated with the first user and data associated with the second user, and without using data associated with any other user. In some implementations, the selection system may determine the entity for the selection based on the first exchange profile, the second exchange profile, and a third exchange profile associated with a third user. For example, the third user may be acquaintances, friends, coworkers, family members, or the like, with the first user and/or the second user, as described above. Here, for example, the first user may have requested a selection that is based on the second user and the third user (e.g., by tapping the first user device to the second user device and a user device of the third user).

In some implementations, in response to receiving a request for a selection for the first user and the second user (i.e., a joint selection), the selection system may determine an entity that is relevant to the first user and the second user. Here, the selection system may determine the entity based on the first exchange profile, the second exchange profile, and at least one additional exchange profile associated with an additional user (e.g., that is unknown to the first user and the second user), in a similar manner as described above. For example, the additional user may share one or more characteristics (e.g., age, income, number of children, or the like) with the first user and/or the second user. Moreover, in this case, the entity determined by the selection system may be an entity that is not involved in an exchange of the first user or the second user (e.g., the entity may be involved in an exchange of the additional user).

Figure 1D:
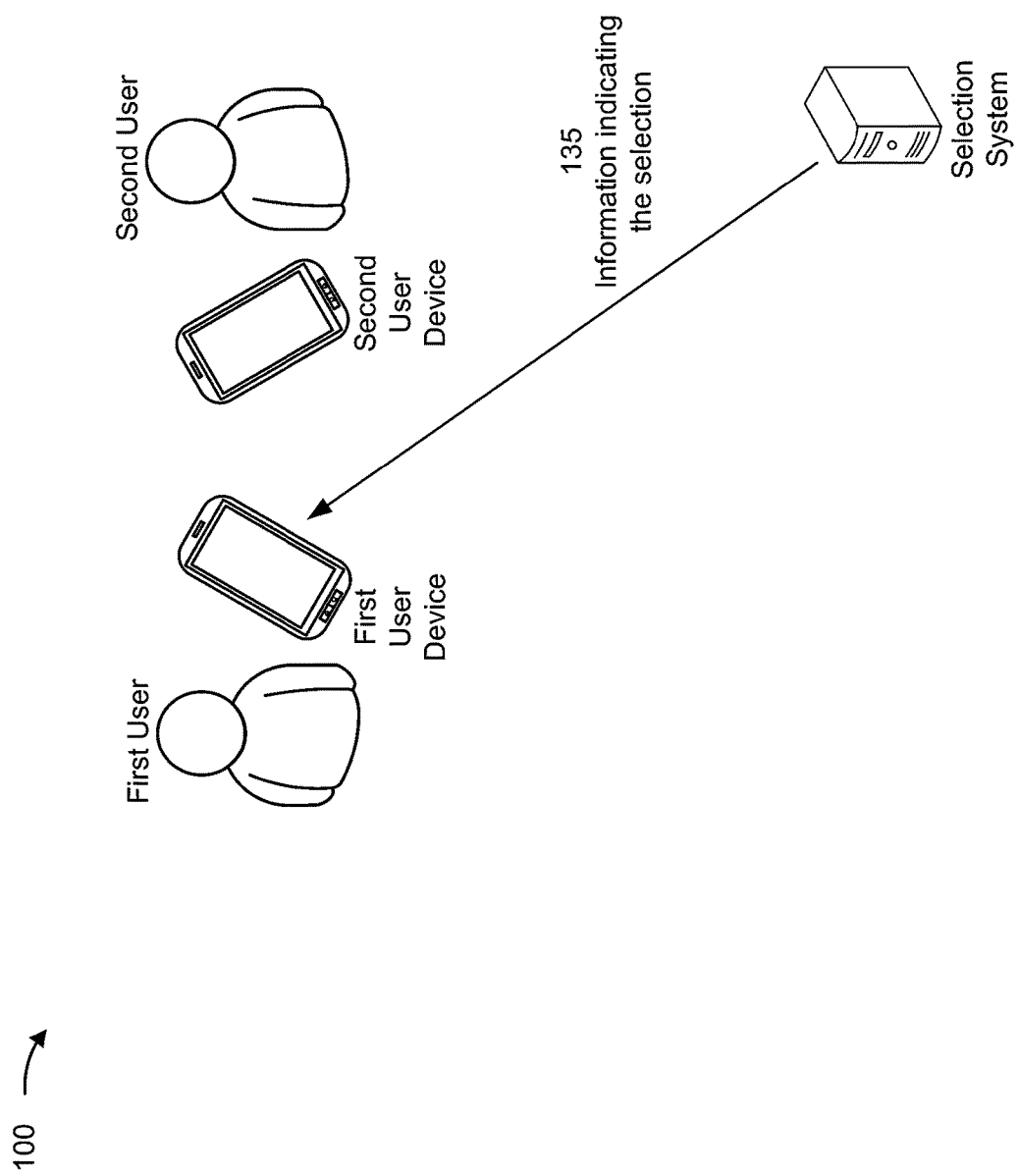

As shown in FIG. 1D, and by reference number 135, the selection system may transmit, and the first user device may receive, information indicating the selection for the user. The selection may identify the entity (e.g., one or more entities) determined by the selection system for the user. The information may include, and/or may cause the first user device to display, a name of the entity, an address of the entity, a phone number of the entity, a link to a website of the entity, directions to the entity from a current location of the first user, and/or a link to a webpage with reviews of the entity, among other examples. In some implementations, the information may include a prompt to cause booking of a reservation for the first user with the entity and/or a prompt to cause generating a calendar entry associated with the entity, among other examples.

Figure 1E:
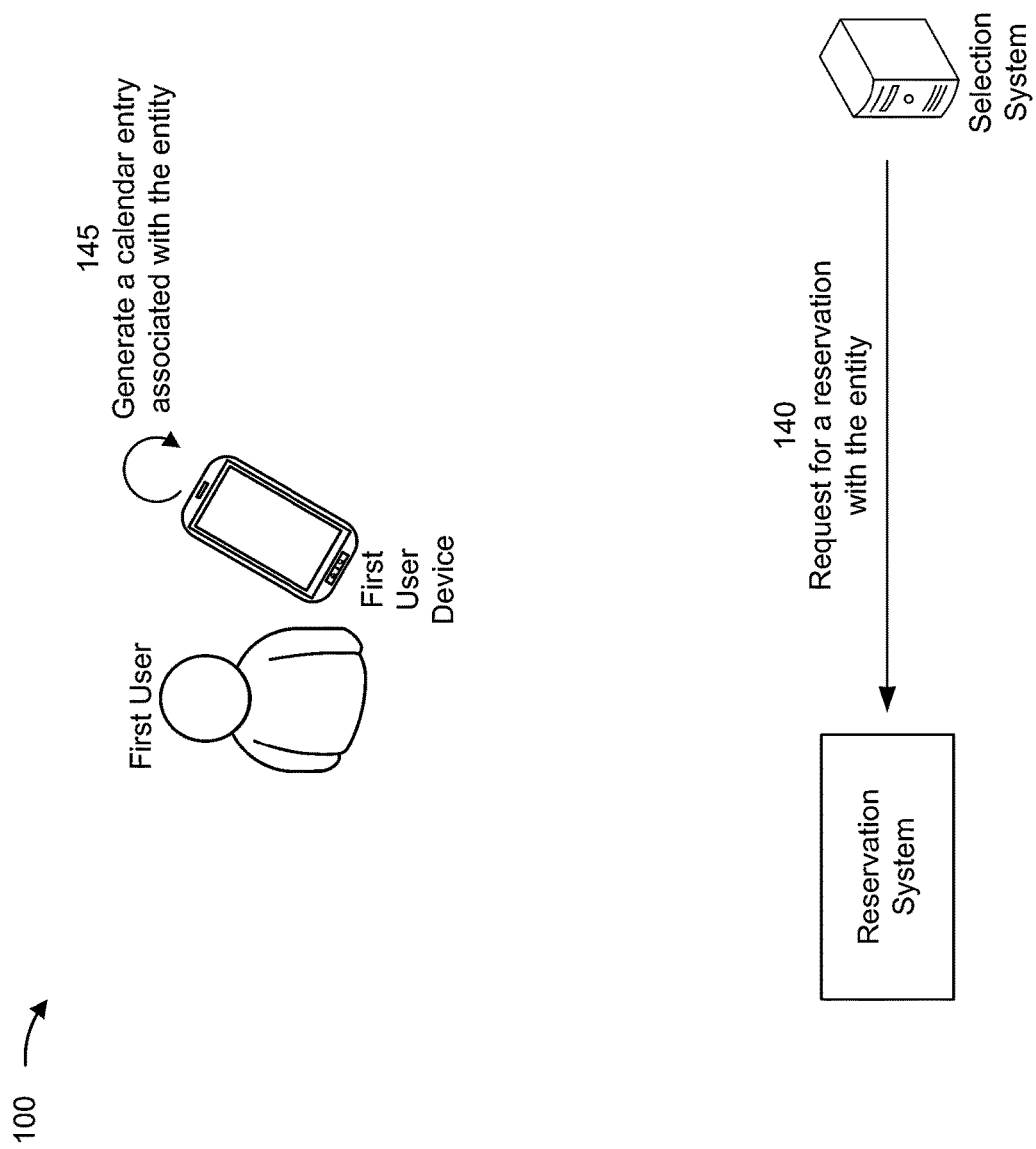

As shown in FIG. 1E, and by reference number 140, the selection system may transmit, to a reservation system, a request for a reservation (e.g., a dinner reservation, a purchase of tickets) for the first user with the entity. The selection system may transmit the request automatically based on determining the entity, or the selection system may transmit the request based on a request made by the first user device via a prompt. The selection system may receive a confirmation of the reservation from the reservation system, and the selection system may transmit information relating to the confirmation to the first user device.

In some implementations, the first user device may transmit the request for the reservation. For example, the first user device may transmit the request for the reservation automatically based on receiving the information indicating the selection. In some implementations, the first user device may determine a time and/or a date that the first user is available for the reservation based on scheduling information associated with the first user (e.g., the first user device may determine the availability of the first user based on scheduling information obtained from a calendar application implemented on the first user device). Accordingly, the first user device may transmit the request for the reservation in accordance with the availability of the first user. As described above, the first user device may receive a confirmation of the reservation from the reservation system.

As shown by reference number 145, the first user device may generate a calendar entry associated with the entity. For example, the calendar entry may indicate a time and/or a date for the first user to visit the entity, may indicate a reminder for the first user to perform one or more actions in connection with the entity (e.g., make a dinner reservation, visit a website for more information, or the like), may indicate a time and/or a date for a reservation for the first user with the entity, or the like. The first user device may generate the calendar entry automatically based on receiving the information indicating the selection and/or based on receiving the information relating to the confirmation of the reservation. In some implementations, the first user device may generate the calendar entry in accordance with an availability of the first user that is determined based on scheduling information associated with the first user, as described above. The first user device may generate the calendar entry using a local calendar service (e.g., the calendar application) of the first user device or a remote (e.g., cloud-based) calendar service.

In some implementations, the selection system may generate a calendar entry associated with the entity. The selection system may generate the calendar entry based on determining the entity, or the selection system may generate the calendar entry based on a request made by the first user device via a prompt. The selection system may generate the calendar entry using a calendar service remote to the first user device.

In this way, the selection system provides relevant selections using historical data associated with just two users or a small group of users. Moreover, the selection system may determine recommendations of interest to a user with improved accuracy. Thus, the selection system conserves significant computing resources relative to a recommendation engine that processes hundreds, thousands, or even millions of records to determine recommendations and/or that generates less accurate recommendations.

As indicated above, FIGS. 1A-1E are provided as an example. Other examples may differ from what is described with regard to FIGS. 1A-1E.

Figure 2:
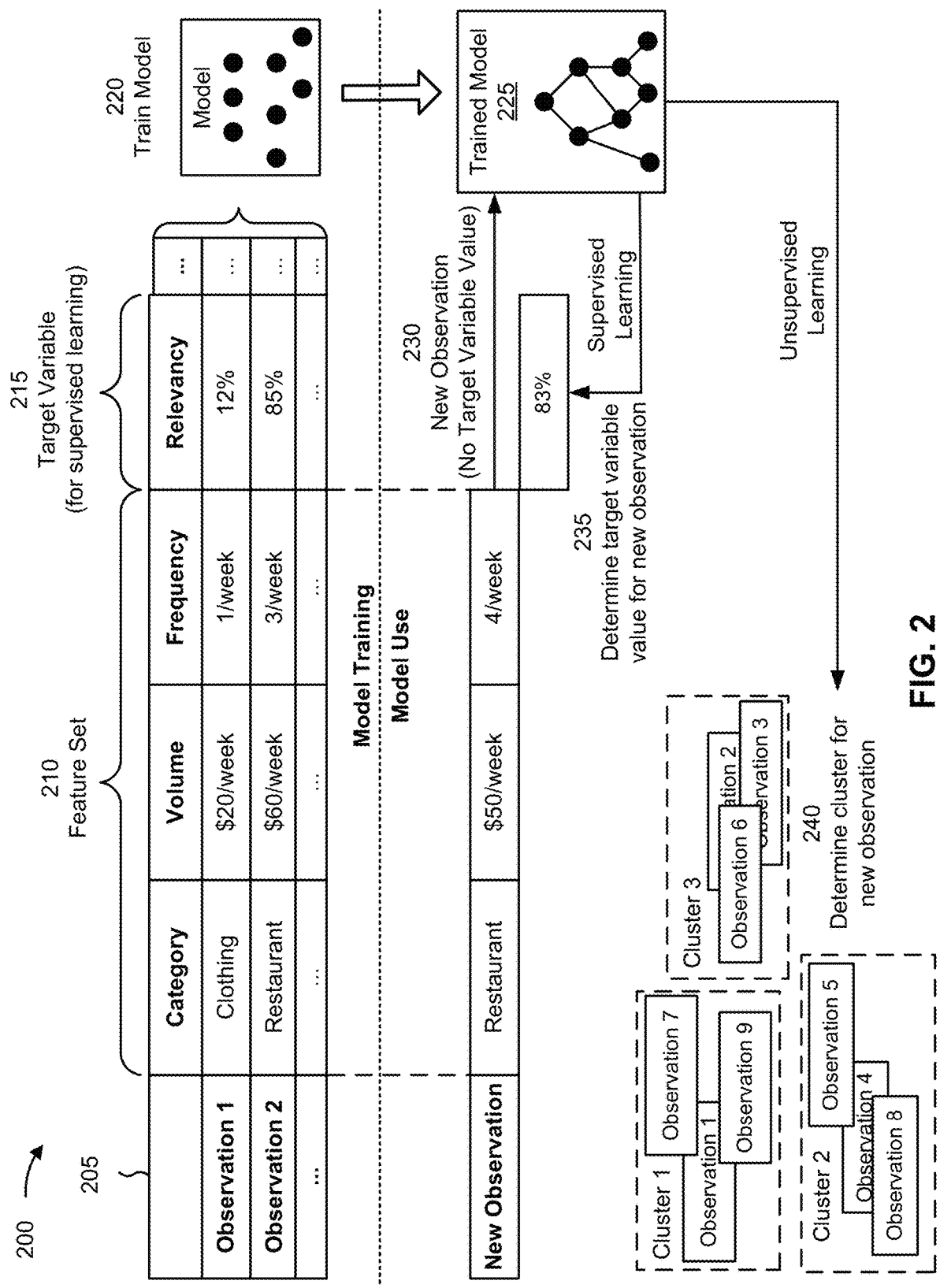
FIG. 2 is a diagram illustrating an example of training and using a machine learning model in connection with peer-based selection.

FIG. 2 is a diagram illustrating an example 200 of training and using a machine learning model in connection with peer-based selection. The machine learning model training and usage described herein may be performed using a machine learning system. The machine learning system may include or may be included in a computing device, a server, a cloud computing environment, or the like, such as the selection system, the first user device, or the second user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a storage system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the storage system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of category, a second feature of volume, a third feature of frequency, and so on. As shown, for a first observation, the first feature may have a value of clothing, the second feature may have a value of $60 per week, the third feature may have a value of one time per week, and so on. These features and feature values are provided as examples, and may differ in other examples. For example, the feature set may include one or more of the following features: entity category preferences, location preferences, exchange amount levels, intersecting characteristics of exchange profiles, entity preferences, a recency of an exchange with an entity, a category of an exchange (e.g., an entity category), an amount of an exchange, a location of an exchange (e.g., an entity location), a volume of exchanges with an entity, a frequency of exchanges with an entity, an exchange amount level for an entity, or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is likelihood of interest, which has a value of 12% for the first observation. For example, a likelihood of interest greater than a threshold, such as greater than 50%, greater than 75%, or the like, may indicate that an entity is relevant (e.g., likely to be of interest) to a user.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on historical exchange data associated with one or more users and/or historical exchange profiles associated with one or more users.

As shown by reference number 230, the machine learning system may apply the trained machine learning model 225 to a new observation, such as by receiving a new observation and inputting the new observation to the trained machine learning model 225. As shown, the new observation may include a first feature of restaurant, a second feature of $50 per week, a third feature of four times per week, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 83% (e.g., indicating a likelihood of interest) for the target variable of likelihood of interest for the new observation, as shown by reference number 235. Based on this prediction, the machine learning system may provide a recommendation, may provide output for determination of a recommendation, may perform an automated action, and/or may cause an automated action to be performed (e.g., by instructing another device to perform the automated action), among other examples. The recommendation may include, for example, one or more entities that are relevant to a user. The automated action may include, for example, transmitting a request for a reservation with an entity, generating a calendar entry associated with the entity, or the like.

As another example, if the machine learning system were to predict a value of 5% for the target variable of likelihood of interest, then the machine learning system may not provide a recommendation, may provide a different recommendation, may not perform an automated action, and/or may perform or cause performance of a different automated action.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., high likelihood of interest), then the machine learning system may provide a recommendation of one or more entities that are relevant. Additionally, or alternatively, the machine learning system may perform an automated action and/or may cause an automated action to be performed (e.g., by instructing another device to perform the automated action) based on classifying the new observation in the first cluster, such as the automated action described above.

As another example, if the machine learning system were to classify the new observation in a second cluster (e.g., low likelihood of interest), then the machine learning system may not provide a recommendation, may provide a different recommendation, may not perform an automated action, and/or may perform or cause performance of a different automated action.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine a selection of an entity for a user. The machine learning system enables recognition and/or identification of tens, hundreds, thousands, or millions of features and/or feature values for tens, hundreds, thousands, or millions of observations, thereby increasing accuracy and consistency and reducing delay associated with determining a selection of an entity relative to requiring computing resources to be allocated for tens, hundreds, or thousands of operators to manually determine a selection of an entity using the features or feature values.

As indicated above, FIG. 2 is provided as an example. Other examples may differ from what is described in connection with FIG. 2.

Figure 3:
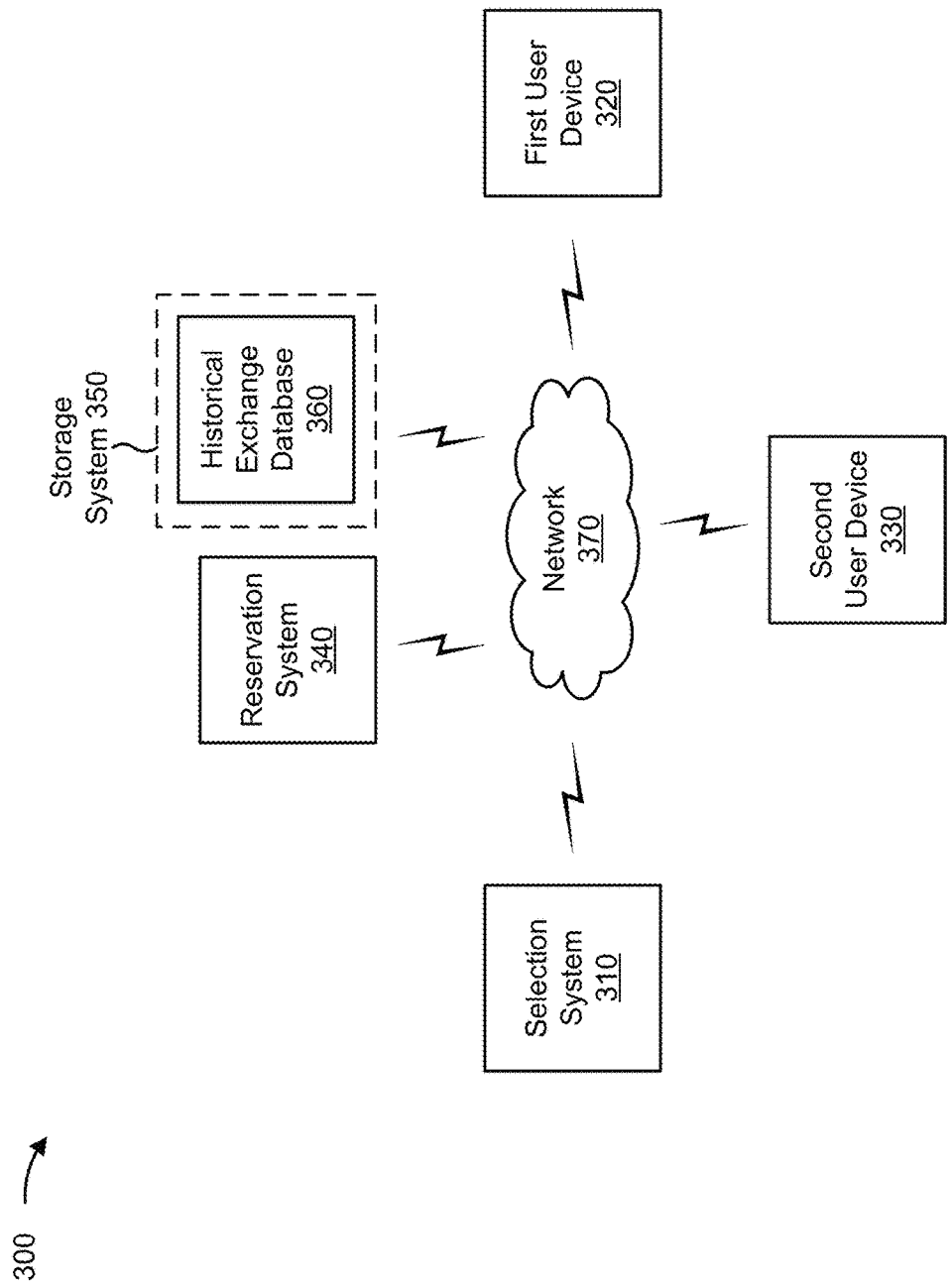
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a selection system 310, a first user device 320, a second user device 330, a reservation system 340, a storage system 350 (e.g., that includes a historical exchange database 360), and a network 370. Devices of environment 300 may interconnect via wired connections, wireless connections, or a combination of wired and wireless connections.

The selection system 310 includes one or more devices capable of receiving, generating, storing, processing, providing, and/or routing information associated with peer-based selection, as described elsewhere herein. The selection system 310 may include a communication device and/or a computing device. For example, the selection system 310 may include a server, such as an application server, a client server, a web server, a database server, a host server, a proxy server, a virtual server (e.g., executing on computing hardware), or a server in a cloud computing system. In some implementations, the selection system 310 includes computing hardware used in a cloud computing environment.

The first user device 320 includes one or more devices capable of receiving, generating, storing, processing, and/or providing information associated with peer-based selection, as described elsewhere herein. The first user device 320 may include a communication device and/or a computing device. For example, the first user device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The second user device 330 includes one or more devices capable of receiving, generating, storing, processing, and/or providing information associated with peer-based selection, as described elsewhere herein. The second user device 330 may include a communication device and/or a computing device. For example, the second user device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The reservation system 340 includes one or more devices capable of receiving, generating, storing, processing, providing, and/or routing information associated with requesting reservations with an entity, as described elsewhere herein. The reservation system 340 may include a communication device and/or a computing device. For example, the reservation system 340 may include a server, such as an application server, a client server, a web server, a database server, a host server, a proxy server, a virtual server (e.g., executing on computing hardware), or a server in a cloud computing system. In some implementations, the reservation system 340 includes computing hardware used in a cloud computing environment.

The storage system 350 includes one or more devices capable of receiving, generating, storing, processing, and/or providing information associated with peer-based selection, as described elsewhere herein. The storage system 350 may include a communication device and/or a computing device. For example, the storage system 350 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the storage system 350 may include the historical exchange database 360. The storage system 350 may communicate with one or more other devices of environment 300, as described elsewhere herein.

The network 370 includes one or more wired and/or wireless networks. For example, the network 370 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 370 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
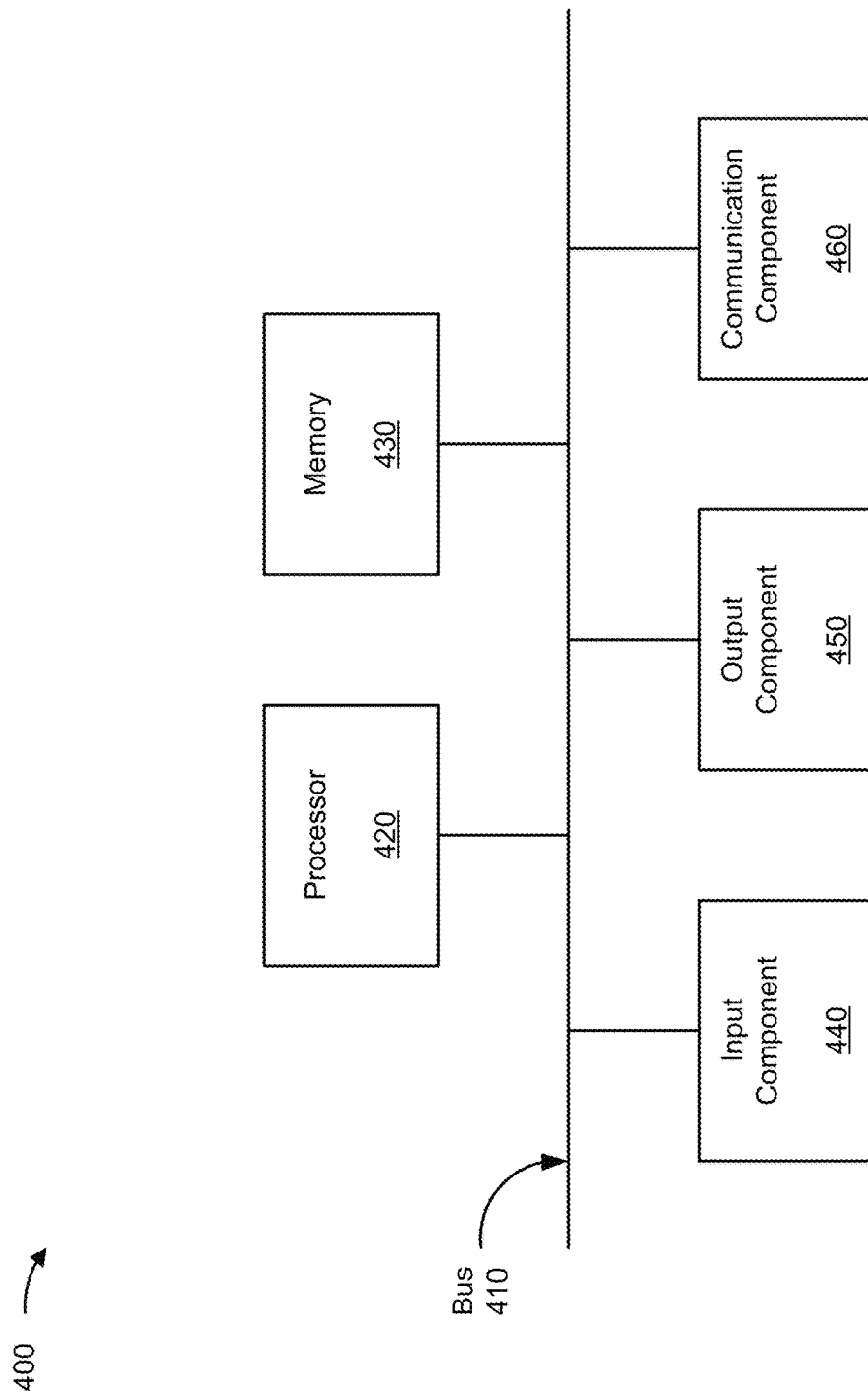
FIG. 4 is a diagram of example components of one or more devices of FIG. 3.

FIG. 4 is a diagram of example components of a device 400, which may correspond to selection system 310, first user device 320, second user device 330, reservation system 340, and/or storage system 350. In some implementations, selection system 310, first user device 320, second user device 330, reservation system 340, and/or storage system 350 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
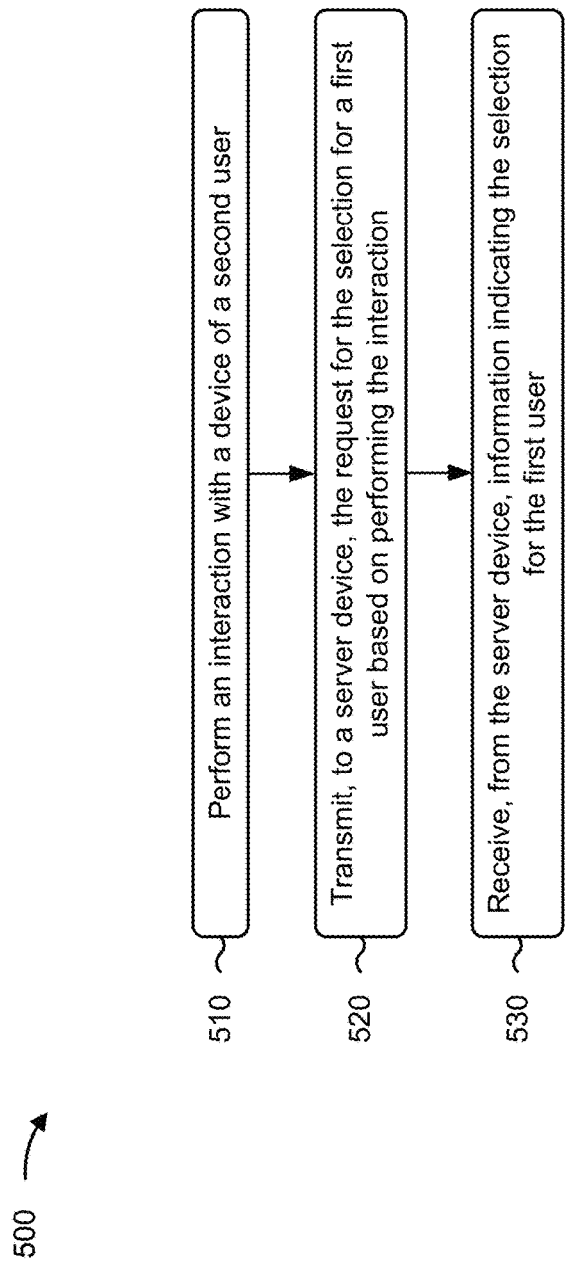
FIGS. 5-6 are flowcharts of example processes relating to peer-based selection.

FIG. 5 is a flowchart of an example process 500 associated with peer-based selection. In some implementations, one or more process blocks of FIG. 5 may be performed by a user device (e.g., first user device 320). In some implementations, one or more process blocks of FIG. 5 may be performed by another device or a group of devices separate from or including the user device, such as selection system 310, second user device 330, reservation system 340, and/or storage system 350. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include performing an interaction with a device of a second user (block 510). In some implementations, the interaction is for initiating a request for a selection for a first user that is based on the second user. As further shown in FIG. 5, process 500 may include transmitting, to a server device, the request for the selection for a first user based on performing the interaction (block 520). As further shown in FIG. 5, process 500 may include receiving, from the server device, information indicating the selection for the first user. In some implementations, the selection identifies an entity involved in at least one exchange of the second user that is relevant to the first user based on a first exchange profile for the first user that identifies one or more characteristics of an exchange behavior of the first user, and a second exchange profile for the second user that identifies one or more characteristics of an exchange behavior of the second user (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E and 2.

Figure 6:
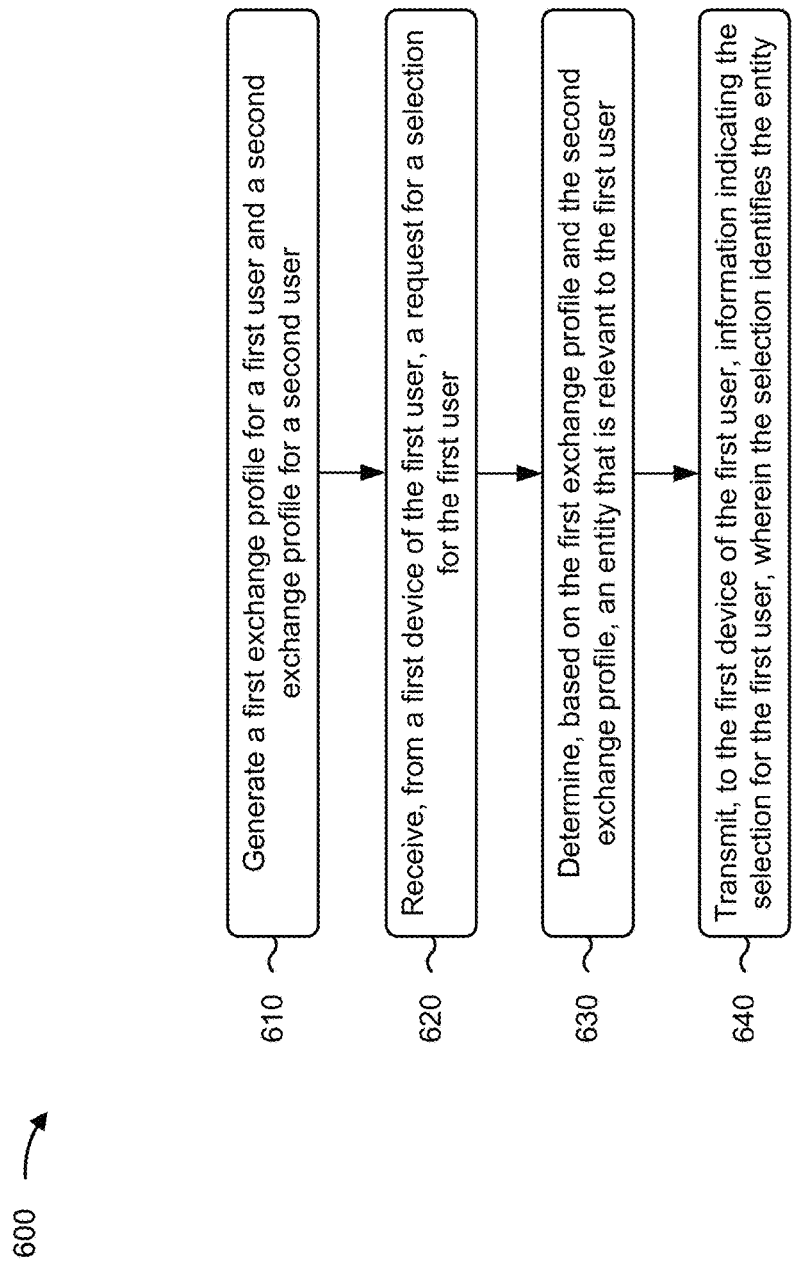

FIG. 6 is a flowchart of an example process 600 associated with peer-based selection. In some implementations, one or more process blocks of FIG. 6 may be performed by a selection system (e.g., selection system 310). In some implementations, one or more process blocks of FIG. 6 may be performed by another device or a group of devices separate from or including the selection system, such as first user device 320, second user device 330, reservation system 340, and/or storage system 350. Additionally, or alternatively, one or more process blocks of FIG. 6 may be performed by one or more components of device 400, such as processor 420, memory 430, input component 440, output component 450, and/or communication component 460.

As shown in FIG. 6, process 600 may include generating a first exchange profile for a first user and a second exchange profile for a second user (block 610). In some implementations, the first exchange profile identifies one or more characteristics of an exchange behavior of the first user based on exchange data of the first user, and the second exchange profile identifies one or more characteristics of an exchange behavior of the second user based on exchange data of the second user. As further shown in FIG. 6, process 600 may include receiving, from a first device of the first user, a request for a selection for the first user (block 620). As further shown in FIG. 6, process 600 may include determining, based on the first exchange profile and the second exchange profile, an entity that is relevant to the first user (block 630). As further shown in FIG. 6, process 600 may include transmitting, to the first device of the first user, information indicating the selection for the first user, wherein the selection identifies the entity (block 640).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with 1A-1E and 2.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for peer-based selection using machine learning, the system comprising:
   one or more memories; and
   one or more processors, communicatively coupled to the one or more memories, configured to:
      train a machine learning model using a feature set that includes a category of an exchange, an amount of an exchange, a location of an exchange, and a recency of an exchange,
         wherein the feature set is associated with a target variable value that is associated with a value the machine learning model is trying to predict, and
         wherein the machine learning model is trained to recognize patterns in the feature set that lead to the target variable value;
      generate a first exchange profile for a first user and a second exchange profile for a second user,
         wherein the first exchange profile identifies one or more characteristics of an exchange behavior of the first user based on exchange data of the first user, and the second exchange profile identifies one or more characteristics of an exchange behavior of the second user based on exchange data of the second user;
      receive, from a first device of the first user and based on performing a near field communication (NFC) or Bluetooth Low Energy (BLE) interaction of the first device of the first user with a second device of the second user, a request for a selection for the first user that is based on the exchange behavior of the second user;
      provide, to the machine learning model and based on receiving the request for the selection via the NFC or BLE interaction, first information indicating a category of a first exchange associated with the first exchange profile, an amount of the first exchange, a location of the first exchange, and a recency of the first exchange;
      provide, to the machine learning model and based on receiving the request for the selection via the NFC or BLE interaction, second information indicating a category of a second exchange associated with the second exchange profile, an amount of the second exchange, a location of the second exchange, and a recency of the second exchange;
      determine, based on processing the first information and the second information using the machine learning model, an entity involved in at least one exchange of the second user that is relevant to the first user,
         wherein the machine learning model predicts a value indicating a likelihood of interest associated with the entity;
      transmit, to the first device of the first user, information indicating the selection for the first user, wherein the selection identifies the entity; and
      automatically cause, based on transmitting the information indicating the selection and in response to receiving the request for the selection for the first user that is based on the exchange behavior of the second user, the first device of the first user to generate a calendar entry associated with the entity using a calendar service remote to the first device of the first user.

2. The system of claim 1, wherein the one or more processors are further configured to:
   transmit, automatically and based on determining the entity, a request for a reservation for the first user with the entity.

3. The system of claim 1, wherein the machine learning model determines the entity based on the feature set.

4. The system of claim 1, wherein processing the first exchange profile and the second exchange profile includes determining an intersection of the first exchange profile and the second exchange profile,
   wherein the intersection indicates at least one characteristic of the one or more characteristics of the exchange behavior of the first user that corresponds to at least one characteristic of the one or more characteristics of the exchange behavior of the second user.

5. The system of claim 1, wherein the second exchange profile relates to an entity category selected for sharing by the second user.

6. The system of claim 1, wherein the one or more characteristics of the exchange behavior of the first user or the one or more characteristics of the exchange behavior of the second user include one or more of volumes of exchanges for one or more entities, frequencies of exchanges for one or more entities, entity categories for one or more entities, or locations for one or more entities.

7. The system of claim 1, wherein the one or more processors are further configured to:
   determine a location of the first user based on one or more recent exchanges of the first user,
      wherein the entity that is determined is associated with the location of the first user.

8. The system of claim 1, wherein the one or more processors, to determine the entity involved in the at least one exchange of the second user that is relevant to the first user, are configured to:
   classify the entity in a cluster, wherein entities associated with the cluster have a threshold degree of similarity, and
   selectively, based on the cluster, perform an automated action associated with the entity.

9. A non-transitory computer-readable medium storing a set of instructions for peer-based selection using machine learning, the set of instructions comprising:
   one or more instructions that, when executed by one or more processors of a machine learning system, cause the machine learning system to:
      train a machine learning model using a feature set that includes a category of an exchange, an amount of an exchange, a location of an exchange, and a recency of an exchange,
         wherein the feature set is associated with a target variable value that is associated with a value the machine learning model is trying to predict, and
         wherein the machine learning model is trained to recognize patterns in the feature set that lead to the target variable value; and
   one or more instructions that, when executed by one or more processors of a first device of a first user, cause the first device to:
      perform a physical interaction with a second device of a second user,
         wherein the physical interaction is for initiating a request for a selection for the first user that is based on exchange behavior of the second user;
      transmit, to a server device, the request for the selection for the first user based on performing the physical interaction;

receive, from the server device, based on the physical interaction, and based on using the machine learning model, information indicating the selection for the first user,
- wherein the selection identifies an entity involved in at least one exchange of the second user that is relevant to the first user based on a first exchange profile for the first user that identifies one or more characteristics of an exchange behavior of the first user, and a second exchange profile for the second user that identifies one or more characteristics of the exchange behavior of the second user,
- wherein information identified by the selection is provided to the machine learning model, and
- wherein the machine learning model predicts a value indicating a likelihood of interest associated with the entity; and automatically generate, based on receiving the information indicating the selection and in response to receiving the request for the selection for the first user that is based on the exchange behavior of the second user, a calendar entry associated with the entity using a remote calendar service.

10. The non-transitory computer-readable medium of claim 9, wherein the physical interaction is an exchange of information between the first device and the second device using near field communication.

11. The non-transitory computer-readable medium of claim 9, wherein the physical interaction is an exchange of information between the first device and the second device via applications implemented on the first device and the second device.

12. The non-transitory computer-readable medium of claim 9, wherein the second exchange profile relates to an entity category selected for sharing by the second user.

13. The non-transitory computer-readable medium of claim 9, wherein the selection is based solely on the first exchange profile and the second exchange profile.

14. The non-transitory computer-readable medium of claim 9, wherein the selection is based on the first exchange profile, the second exchange profile, and a third exchange profile of a third user.

15. A method for peer-based selection, comprising:
training a machine learning model using a feature set that includes a category of an exchange, an amount of an exchange, a location of an exchange, and a recency of an exchange,
- wherein the feature set is associated with a target variable value that is associated with a value the machine learning model is trying to predict, and
wherein the machine learning model is trained to recognize patterns in the feature set that lead to the target variable value;

generating a first exchange profile for a first user and a second exchange profile for a second user,
- wherein the first exchange profile identifies one or more characteristics of an exchange behavior of the first user based on exchange data of the first user, and the second exchange profile identifies one or more characteristics of an exchange behavior of the second user based on exchange data of the second user;

receiving, from a first device of the first user and based on performing a near field communication (NFC) or Bluetooth Low Energy (BLE) interaction of the first device of the first user with a second device of the second user, a request for a selection for the first user that is based on the exchange behavior of the second user;

determining, based on the first exchange profile and the second exchange profile, based on receiving the request for the selection via the NFC or BLE interaction, and using the machine learning model, an entity that is relevant to the first user,
- wherein the machine learning model predicts a value indicating a likelihood of interest associated with the entity;

transmitting, to the first device of the first user, information indicating the selection for the first user, wherein the selection identifies the entity; and automatically causing, based on transmitting the information indicating the selection and in response to receiving the request for the selection for the first user that is based on the exchange behavior of the second user, the first device of the first user to generate a calendar entry associated with the entity using a calendar service remote to the first device of the first user.

16. The method of claim 15, wherein the request for the selection is for the first user and the second user, and
wherein the entity that is relevant to the first user is relevant to the first user and the second user.

17. The method of claim 16, wherein the entity is not involved in an exchange of the first user or the second user.

18. The method of claim 15, wherein the first exchange profile of the first user and the second exchange profile of the second user are generated based on comparing the exchange data of the first user and the exchange data of the second user to exchange data of a plurality of other users.

19. The method of claim 15, further comprising:
transmitting a request for a reservation for the first user with the entity.

20. The method of claim 15, wherein the calendar entry is generated using a calendar service that is remote to the first device of the first user.

* * * * *